METHOD OF MAKING DRAWINGS

Filed Sept. 11, 1957

INVENTOR.
RUSSELL M. PATRICK
BY
ATTORNEYS

United States Patent Office 2,942,973

Patented June 28, 1960

2,942,973

METHOD OF MAKING DRAWINGS

Russell M. Patrick, 5242 W. 15th St., Indianapolis, Ind.

Filed Sept. 11, 1957, Ser. No. 683,430

2 Claims. (Cl. 96—27)

(Granted under Title 35, U.S. Code (1952), sec. 266)

The invention described herein may be manufactured and used by or for the Government of the United States of America for governmental purposes without the payment of any royalties thereon or therefor.

The present invention relates to a method of making drawings that are to be used for producing prefabricated or printed circuitry.

After a drawing of a printed circuitry board is made, the drawing is photographed and reduced in size, and the photo-negative is used to expose a panel that has been coated with a light-sensitive emulsion. It is therefore necessary to accurately lay out and draw the master drawing to a precise scale. Many master drawings are made by the conventional pen and ink method which is not only time consuming, but it is very difficult to make later changes or corrections.

An improvement in making master drawings was made by Carl E. Coy, whose invention, entitled "Method of Making Master Drawings," is described in United States application Ser. No. 540,031, filed October 12, 1955. This application describes a method of making drawings whereby dark cellulose tape backed by paper or fiber and having a pressure sensitive adhesive on one side, is applied to celulose acetate sheets to form the desired circuitry pattern and the completed sheets are then photographed or reproduced on glass cloth to produce a stable master drawing.

The circuitry on a board is normally contained on both sides and junction or connection points are provided so that the two sides can be electrically connected. These junction points appear as circles and the board is drilled or pierced so that two points on opposite sides of the board can be connected electrically. In making the master drawing, one side of the board is first laid out and then, during the layout of the opposite side, extreme care must be exercised so that the junction points are in exact opposite positions to the corresponding points on the other side.

The present invention is for a method of making master drawings whereby the junction or connection points are punched in base material, such as paper, matal, or plastic, and then the opaque circuit lines are applied to each side of the base material. Both sides of the base material are then photographed against a dark background and the finished photo-negatives have perfect registration with one another as no misalignment of the holes is possible, as they are the same on each side.

It is therefore a general object of the present invention to provide an inexpensive and time saving method of making accurate drawings that are to be used to produce printed circuitry boards.

Another object of the present invention is to provide a method of making master drawings for printed circuitry boards wherein the junction or connection points have perfect alignment.

Other objects and many of the attendant advantages of this invention will be readily appreciated as the same becomes better understood by reference to the following detailed description when considered in connection with the accompanying drawing wherein.

Figure 1:
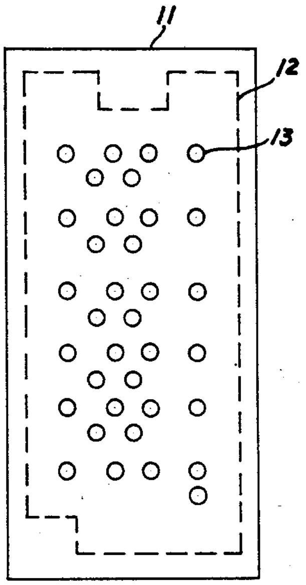
Figure 1 is a plan view showing a plurality of holes in base material.

In carrying out the invention, it has been found that greater accuracy in the finished panel product is obtained if the drawing is made to an enlarged scale and then reduced by photographic means. By way of example, a scale of 4 to 1 might be employed which permits a convenient width tape and diameter holes to be chosen.

Referring now to the drawing, a base material 11 is chosen and the outline of a board may be laid out as shown by lines 12. The base material might be of metal, plastic, paper, or any other opaque material. Applicant has found, however, that the use of white paper of a thickness corresponding to two-ply or three-ply Bristol board works quite satisfactorily and is very economical. Referring now to Figure 1 of the drawing, it can be seen that a plurality of holes 13 are punched in the base material 11, by any suitable punching means.

Figure 2:
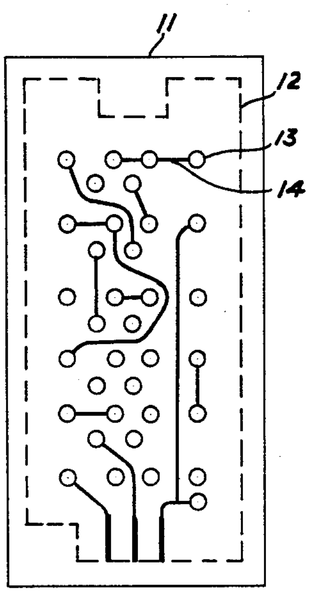
Figure 2 is a plan view similar to Figure 1 but having opaque circuit lines thereon.
Figure 3:
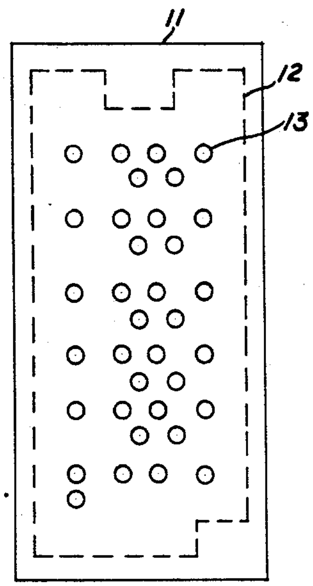
Figure 3 is a plan view similar to Figure 1 but showing the reverse side of the base material.
Figure 4:
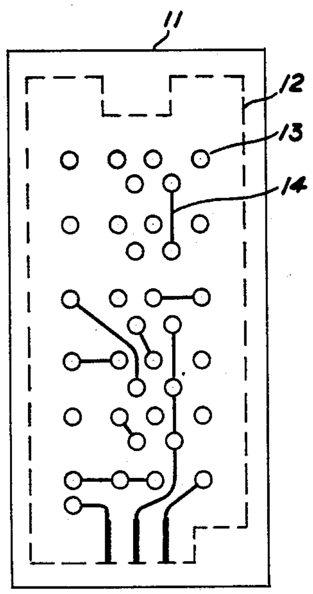
Figure 4 is a plan view similar to Figure 3 but having opaque circuit lines thereon.

The next step of the method herein disclosed consists in applying dark cellulose tape strips 14 to the base material 11, as shown in Figure 2 of the drawing. The arrangement of the strips, of course, will be dictated by the particular circuit that is to be made. The base material 11 is then turned over and appears as shown in Figure 3 of the drawing and the dark cellulose strips 14 are then applied as shown in Figure 4 of the drawing. By way of example, the cellulose strips 14 may be ⅛" in width and the punched holes ½" in diameter and, upon reduction, the strips may be of the order of 1/32" in width and the holes ⅛" in diameter. Different end products, of course, will dictate the use of different sizes and shapes of strips and holes.

Figure 5:
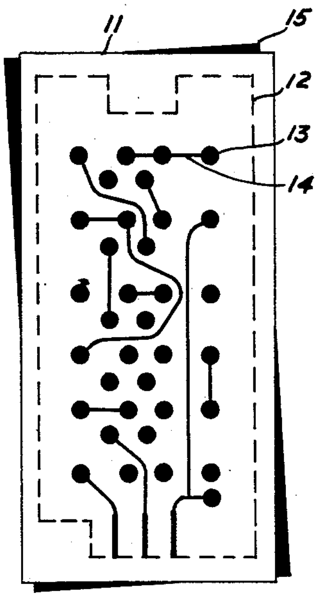
Figure 5 is a plan view showing one side of the base material superimposed over a dark background.
Figure 6:
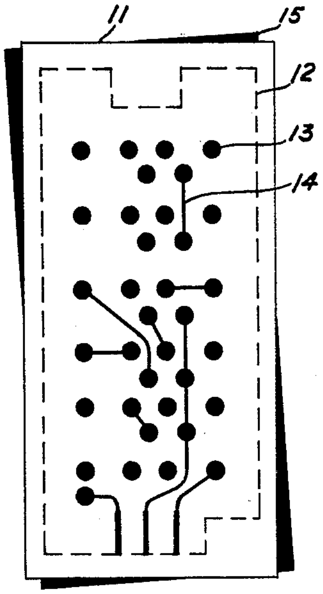
Figure 6 is a plan view similar to Figure 5 but showing the reverse side of the base material.

As shown in Figures 5 and 6, each side of the board is superimposed over a dark background and then photographed. The punched holes appear as dark areas as well as the strips of cellulose tape. The negative or the positive, as the case may be, is then employed to produce either a silk-screen or a photo-etched plate, the process of making both being well known in the art.

The use of Bristol board as a base material has a particular advantage in that a hole that has been misplaced can be readily covered over by another piece of Bristol board and a new hole can be punched even in close proximity to the first hole.

Obviously many modifications and variations are possible in the light of the above teachings. It is therefore to be understood that the invention may be practiced otherwise than as specifically described.

What is claimed is:

1. The method of making master drawings for use in prefabricated circuitry which consists of first punching a plurality of irregularly spaced holes in white reflective base material, said holes being of sufficient size so as to represent junction points of circuits on both sides of a prefabricated circuitry board, then applying various configurations of opaque adhesive tape to both sides of said base material, said configurations of opaque adhesive tape including strips contiguous to a portion of said holes, whereby said tape represents an electrical conductor on a prefabricated circuit board, and then successively photographing each side of said base material while superimposed against a dark background to provide photo-negatives which serve as master drawings.

2. The method of making master drawings for use in prefabricated circuitry as set forth in claim 1 wherein said white reflective base material is white paper having a thickness greater than a thickness corresponding to two-ply Bristol board.

References Cited in the file of this patent

UNITED STATES PATENTS

| | | |
|---|---|---|
| 1,600,447 | Woods | Sept. 21, 1926 |
| 2,478,274 | Johnson | Aug. 9, 1949 |
| 2,716,268 | Steigerwalt | Aug. 30, 1955 |

OTHER REFERENCES

Chemical Engineering Catalogue, Reinhold, N.Y., 1950–51, pp. 1593, 1596, and 1597 (Brochure of Vulcan Copper & Supply Co.).

Photocircuits, Photocircuits Corp., Glen Cove, N.Y., 1954, page 6.

Swiggett; Introduction to Printed Circuits, Rider (1956): pp. 26 and 28–30.